United States Patent Office 3,261,799
Patented July 19, 1966

3,261,799
FREEZE-THAW STABLE AMINOESTER POLYMER
George B. Vermont, Wilmington, Del., assignor to E. I. du Pont de Nemours and Company, Wilmington, Del., a corporation of Delaware
No Drawing. Filed Jan. 6, 1965, Ser. No. 423,845
19 Claims. (Cl. 260—29.6)

This invention concerns a novel freeze-thaw aqueous dispersion useful for formulating adhesives and coating compositions. In particular, this invention relates to a freeze-thaw stable aqueous dispersion of an aminoester polymer that is utilized as an adhesive and as a film forming material in durable paint compositions designed for all types of exposure. More particularly, this invention concerns a latex of a negatively charged water-insoluble vinyl addition polymer having pendant carboxyl groups and monovalent aminoester radicals attached to the carbon atoms of the polymer backbone in which the latex is adjusted to an alkaline pH with morpholine or a simple alkyl derivative thereof, is extremely stable under conditions of freezing and thawing, air dries to a continuous coating, and has excellent wet and dry adhesion to a variety of substrates.

The term "latex" designates an aqueous dispersion of a water-insoluble polymer which is present in the form of very fine particles.

An application by Simms, Serial No. 379,708, filed July 8, 1964, shows a novel "aminoester polymer latex" which is formulated by reacting a carboxylic polymer latex with an aziridine compound. However, these aminoester latices formulated by Simms are not sufficiently freeze-thaw stable to be useful in adhesives and particularly in coating compositions, such as paints.

"Carboxylic polymer" designates a substantially water-insoluble interpolymer containing pendant carboxyl groups (—COOH) or their salts (e.g., —COONH$_4$). This interpolymer is the product of at least one monomer containing both polymerizable olefinic unsaturation and a carboxylic acid group with at least one other monomer which is copolymerizable therewith.

Latices of the aminoester polymer in which the pH is adjusted with well known bases, such as, ammonium hydroxide, diethylethanol amine, triethylene diamine, sodium hydroxide and tetramethyl ammonium hydroxide, result in a product which is not freeze-thaw stable but readily thickens and coagulates when subjected to freezing. Surprisingly, latices of the aminoester polymer in which the pH is adjusted with morpholine or a simple alkyl derivative thereof have excellent freeze-thaw stability, also have good adhesive properties, can be readily pigmented to form paint compositions without polymer coagulation, and when formulated into a paint have excellent adhesion to all types of substrates even when containing large concentrations of nonionic surfactants which are often necessary to disperse pigments. Paints formed from the freeze-thaw stable latices of this invention are extremely durable to weathering and have excellent flex and crack resistance.

The novel product of this invention is a freeze-thaw stable film forming composition of an aqueous dispersion of a water-insoluble negatively charged carboxylic vinyl addition polymer and a compound of the formula:

FORMULA A

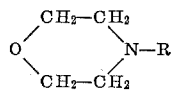

wherein R is hydrogen or from the group of $C_1$ to $C_4$ alkyl radicals. The vinyl addition polymer is formed from monomer units which contain from 2 to 20 carbon atoms and the polymer contains about 0.3–5% by weight of ethylenically unsaturated monovinylidene carboxylic acid units, but preferably contains 1.5 to 3% by weight of acid units. In any event, sufficient anionic carboxylic acid radicals (i.e., —COO$^-$ groups) must be present to impart to the polymer an overall negative charge. The vinyl addition polymer has attached to the carbon atoms of the polymer backbone monovalent aminoester radicals that have the following formula:

FORMULA B

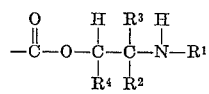

In Formula B, $R^1$ is H, benzyl or a $C_1$ to $C_5$ alkyl radical. $R^2$ and $R^3$ are selected from the group of H, benzyl, aryl and a $C_1$ to $C_5$ alkyl radical. $R^4$ is H or a $C_1$ to $C_5$ alkyl radical. Preferably, $R^1$, $R^3$ and $R^4$ are hydrogen and $R^2$ is either hydrogen or methyl.

These aminoester radicals constitute about 0.3–3% of the weight of the vinyl addition polymer, but preferably the aminoester content is about 0.1–1% by weight.

The novel aqueous dispersion of this invention has a pH between 7 and 10, but preferably, a pH between 8 and 10. The dispersion also contains about 0.3 to 10% based on the weight of the polymer, of an anionic or an nonionic surfactant or a mixture thereof, but preferably contains about 1 to 6% by weight of the nonionic surfactant.

It is recognized that the pendant aminoester radicals of the above polymer often partially isomerize and form hydroxy amide groups. When this occurs, an equilibrium is usually reached between the aminoester and hydroxy amide groups. Both the aminoester and the hydroxy amide radicals give the polymer its unique properties.

To form the freeze-thaw stable product of this invention, a carboxylic polymer latex is formed in which the polymer contains monomer units having 2 to 20 carbon atoms. This carboxylic polymer latex is then reacted with an aziridine compound, which is often referred to as an alkylene imine. This reaction is herein referred to as an "imination reaction." To enhance the freeze-thaw stability of the "iminated latex," i.e., the above carboxylic polymer latex which has been reacted with alkylene imine, the pH of the iminated latex is adjusted to about 7 to 10 with a compound represented by Formula A, i.e., morpholine or a simple alkyl derivative thereof. When the latex is to be used in a paint composition, a pH of 9–10 is preferred.

Preferably, morpholine is used since it is readily available but the alkyl derivatives of morpholine are also useful, such as, N-methylmorpholine, N-ethylmorpholine, N-propylmorpholine, and N-butylmorpholine.

The carboxylic polymer latex is prepared by known methods of emulsion polymerization in which a carboxylic acid monomer is reacted in an aqueous medium with copolymerizable monomers that are not carboxylic acids. A wide variety of ethylenically unsaturated monovinylidene carboxylic acids can be used to provide carboxyl units to the polymer. Methacrylic acid, acrylic acid, crotonic acid and itaconic acid are the more practical species. For example, when the copolymer consists of units of acrylic acid esters and methacrylic acid esters, methacrylic acid is preferred; with vinyl acetate copolymers, crotonic acid is preferred.

A variety of copolymerizable monomers having $C_2$ to $C_{20}$ carbon atoms and preferably $C_2$ to $C_{12}$ carbon atoms form useful carboxylic polymers when reacted with the aforementioned ethylenically unsaturated carboxylic acids. The following copolymerizable compounds, for example, form particularly useful coating compositions: alkyl esters of acrylic and methacrylic acid in which the alkyl group contains 1 to 12 carbon atoms; conjugated dienes having 4 to 10 carbon atoms, such as butadiene; olefins, such as ethylene; other copolymerizable compounds include acrylonitrile, styrene, alkyl-substituted styrene, vinyl acetate, dibutyl maleate, or blends of two or more of these compounds.

Carboxylic polymers having the following monomeric constituents are particularly useful in this invention: methacrylic acid/methacrylic acid ester of a $C_1$ to $C_4$ saturated aliphatic monohydric alcohol; methacrylic acid/acrylonitrile/butyl acrylate; methacrylic acid/styrene/butylacrylate; methacrylic acid/styrene/butadiene; methacrylic acid/ethylene; methacrylic acid/dibutyl maleate/vinyl acetate; and methacrylic acid/vinyl acetate/acrylic acid ester of $C_1$ to $C_8$ saturated adiphatic monohydric primary alcohol.

This invention particularly encompasses freeze-thaw stable aminoester latices which are used in outdoor paints to protect primarily wood substrates. The polymer for this particular use must have physical properties which will withstand the conditions of expansion and contraction of the wood substrate under wide ranges of climatic conditions. For this purpose, the carboxylic polymer is at least ternary in composition and contains about 0.3 to 5% by weight of (A) saturated monovinylidene carboxylic acid units; but preferably contains about 1.5 to 3% by weight of acid units; the remainder of the interpolymer contains a mixture of alpha,beta-unsaturated monovinylidene esters of (B) methacrylic acid and (C) acrylic acid; said esters (B) and (C) are of a $C_2$ to $C_8$ saturated monohydric primary alcohol. Preferred $C_2$ to $C_8$ alcohols include ethanol, butanol, 2-ethylhexanol, octanol-1, isobutanol, hexanol-1 and pentanol-1. Particularly preferred esters are methyl methacrylate, ethyl acrylate and 2-ethylhexyl acrylate.

Typical of the known methods of making a carboxylic polymer latex useful in the practice of this invention are those described in U.S. Patents 2,395,017; 2,724,707; 2,787,603; 2,868,752; 2,868,754; 2,918,391 and 3,032,521, the disclosures of which are incorporated herein by reference. Especially pertinent is the method described in U.S. 2,724,707, column 5, line 21 to column 6, line 60.

The emulsions used in preparing the carboxylic polymer latex is composed of the mixture of monomers, suitable emulsification and suspension agents (surfactants), buffering agents for pH control and a free radical catalyst; for example, potassium persulfate, a peroxide, such as hydrogen peroxide; a diazo compound, such as azobisisobutyramidine hydrochloride or a redox type, such as persulfate-sulfite; or mixtures of such catalysts. Polymerization can be carried out in the presence of a free radical catalyst in a closed vessel in an inert atmosphere and under autogenous pressure or under artificially induced pressure or in an open vessel under reflux at atmospheric pressure. The temperatures of the polymerization can be varied from 0° C. or lower to 100° C. or higher, preferably from 20° C. to 90° C., depending to a large degree upon the activity of the monomers and catalyst used and the molecular weight desired in the polymer product.

The carboxylic polymer is produced in any molecular weight that is desired; usually the molecular weight is above 100,000 for polymers used as the film forming constituent of paints but even molecular weights of about a million and above are frequently used.

In the interest of obtaining a substantially water-insoluble carboxylic polymer and a stable latex product, it is usually best to add less than 10% acid monomer based on the total weight of monomer in the reaction mixture, while insuring, in any event, that the polymer after the imination reaction contains at least 0.3% by weight of carboxylic monomer units. Thus, the iminated polymer product is characterized by having an overall negative charge imparted to it by the pendant carboxyl radicals and has attached to the carbon atoms of the polymer backbone monovalent aminoester radicals.

The acid content of the carboxylic polymer can be determined by separating the polymer from the aqueous phase, dissolving it in a solvent and titrating the resulting polymer solution with alcoholic KOH to a phenolphthalein end-point. The acid content can also be determined by complete chemical analysis of the polymer.

In the typical procedure for carrying out the imination reaction, the aziridine compound is mixed with the carboxylic polymer latex in a reaction vessel under atmospheric pressure.

The aziridine compounds used in this reaction have the following formula:

FORMULA C

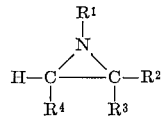

wherein $R^1$, $R^2$, $R^3$ and $R^4$ and as defined in Formula B.

Ethylenimine (Formula D) and 1,2-propylenimine (Formula E) as shown hereinafter are particularly preferred aziridines useful in this invention because of their relatively low cost and plentiful supply and because they tend to provide the final product with excellent adhesive properties.

FORMULA D  FORMULA E

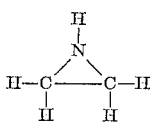 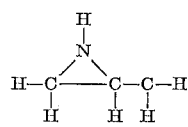

It is quite unexpected and surprising that the aziridine compound reacts effectively and efficiently with a carboxylic polymer latex since it is well known that aziridines are susceptible to hydrolysis and polymerization in an aqueous media. It is recognized that a portion of the aziridine compound does hydrolyse and polymerize during the imination reaction and that the resulting aminoester latex contains these by-products such as the aminoalcohol from the aziridine compound and a polymer from the aziridine compound. Furthermore, it is recognized that these by-products do interact to some extent with the aminoester polymer and also increase the wet adhesion of the aminoester latex.

Preferably, the amount of aziridine compound added to the carboxylic polymer latex is 10 to 70% of the molar amount of aziridine which is necessary to esterify all the pendant carboxyl groups of the carboxylic polymer to aminoester groups, assuming 100% conversion of the aziridine to aminoester. The mixture is stirred and reacted at about 35 to 90° C. until the reaction is completed (e.g., about ½ hour at the higher temperatures to about 12 hours at the lower temperatures). Finally, the reaction product is cooled to room temperature. The upper temperature limit of the imination reaction is determined largely by how much heat the particular latex will withstand without coagulating. The entire reaction can be carried out at room temperature, but heating is much preferred because of the shorter reaction time.

As aforementioned, after imination of the carboxylic polymer, the pH of the aminoester latex is adjusted to about 7-10 by addition of a compound represented by Formula A which provides the latex with excellent freeze-thaw stability.

The freeze-thaw stable aminoester polymer latex is useful as the film forming constituent in a wide variety of coating compositions, such as outdoor and indoor house paints, concrete paints, clear finishes for wood, bowling lane finishes, clear finishes for metals, such as aluminum and chrome.

To form a pigmented coating composition, any of the ordinary water-insoluble inorganic and organic paint pigments well known in the art can be used with the novel aminoester latex. However, the relative amount and type of pigment in the latex has a significant effect on the properties of the paint. A pigment volume concentration of about 10% is about the minimum proportion of pigment which will provide a paint which has a practical hiding power. The maximum proportion of pigment volume concentration is about 50%. Preferably, however, a pigment volume concentration in the range of 25 to 40% is desirable. Pigment volume concentration is the ratio expressed on a percent basis of the volume of pigment to the total volume of pigment plus film forming materials of the compositions; the "volume of pigment" is the volume of vehicle displaced by the pigment wet with vehicle.

Various auxiliary agents which are normally used in latex base paints can also be added, including bodying agents, such as methyl cellulose, defoaming agents, such as tributyl phosphate or waxes, humectants, such as ethylene glycol or water-soluble gums and bactericides or fungicides, such as borax.

Surprisingly, the freeze-thaw stable aminoester polymer latices of this invention are even useful as finishes for poromeric materials, particularly poromeric materials formed with a microporous polyurethane which is reinforced with polyester and are also useful as heat sealable coatings on polyolefin films and polyester films and as coatings on fibers, such as nylon and polyester fibers.

Furthermore, the freeze-thaw stable aminoester polymer latices of this invention are useful as adhesives for a wide variety of materials, for example, vinyl film to fabrics, nylon to fabrics, vinyl to cotton, cellophane to paper, nylon film to paper and polypropylene film to paper. The adhesives formulated from the aminoester polymer latices of this invention have a superior bond strength to those adhesives formulated from the corresponding carboxylic polymer latices which are iminated with an amount of alkylene imine which is in excess of 70% of the molar amount necessary to esterify all the pendant carboxyl groups.

While any of the water-soluble anionic and nonionic surfactants ordinarily used in aqueous emulsion polymerization techniques can be used in the aqueous dispersion of this invention, sodium lauryl sulfate is one preferred anionic surfactant which provides polymer particles of optimum size. A preferred nonionic surfactant is octyl phenyl polyglycol ether. Soluble alkali metal and ammonium salts of half esters of sulfuric acids with long chain fatty alcohols can also be used, as can water soluble polyalkylene oxide derivatives. Other surfactants which can be used include alkyl aryl sulfonates, sulfated and sulfonated esters and ethers and alkyl sulfonates. Numerous additional species of anionic and nonionic surfactants useful in this invention are listed in "Synthetic Detergents" by J. W. McCutcheon, published annually by MacNair-Dorland Company, New York.

The examples which follow are given for the purpose of illustrating the invention. All quantities shown are on a weight basis unless otherwise indicated. The water listed in the formulas is deionized water.

*Example 1*

An aminoester polymer is prepared by first forming a latex of a carboxylic polymer.

LATEX A

| Portion 1: | Parts by weight |
|---|---|
| Water | 405.0 |
| Anionic surfactant (30% aqueous solution of sodium lauryl sulfate) | 1.0 |
| Portion 2: | |
| Water | 18.2 |
| Potassium persulfate | 0.6 |
| Portion 3: | |
| 2-ethylhexyl acrylate | 191.2 |
| Methyl methacrylate | 159.0 |
| Methacrylic acid | 10.8 |
| Portion 4: | |
| Water | 71.0 |
| Anionic surfactant (30% aqueous solution of sodium lauryl sulfate) | 6.2 |
| Portion 5: | |
| Water | 4.0 |
| Potassium persulfate | 0.2 |
| Total | 867.2 |

Each portion is premixed before it is added. Portion 1 is charged into a conventional polymerization vessel equipped with stirrer, thermometer, condenser and means to introduce nitrogen and reagents. The following polymerization reaction is carried out under nitrogen. Portion 1 is heated to 70° C., Portion 2 is added with constant stirring, and while the contents of the vessel are kept at 70 to 80° C., Portions 3 and 4 are added gradually and simultaneously over a period of 2 hours. Then Portion 5 is added, and the temperature of the mixture is kept at 70 to 80° C. for another 2 hours. The resulting carboxylic polymer latex is cooled at 25° C. and is filtered through cheesecloth to remove any coarse coagulum that has formed. The latex is then immediately neutralized with ammonium hydroxide.

Carboxylic Polymer Latex A has a polymer solids content of about 42%. The polymer is a 53:44:3 interpolymer of 2-ethylhexyl acrylate:methyl methacrylate:methacrylic acid and has a molecular weight of over a million. The latex batch is divided into three equal portions which are iminated respectively with ½, ⅔ and ⅗ of the molar amount of imine required to esterify all the pendant carboxyl groups.

The imination reaction is conducted in a reaction vessel equipped with a stirrer, a thermometer, a condenser and an addition funnel. The vessel is charged with a portion of Latex A and heated to about 50° C. and the charge of propylenimine is added gradually over a period of 10 minutes with stirring. The temperature of the mixture is maintained at 50° C. for an additional 30 minutes. The result aminoester polymer latex is slowly cooled to 25° C. Each of the iminated latex portions is then divided into four equal parts and the pH of each part is adjusted to 10, respectively, with ammonium hydroxide, diethylethanol amine, triethylenediamine and morpholine. Each latex is filtered through cheesecloth to remove any coarse coagulum that has formed.

Each of the above iminated latices in which the pH is adjusted with the aforementioned bases is tested for freeze-thaw stability. About 100 parts of each of the iminated and pH adjusted latices are placed in a small container and subjected to a freeze-thaw cycle of 16 hours at −18° C. and 16 hours at about 25–26° C. After each cycle, the latices are examined for polymer coagulation. The results of this test are shown in Table I and indicate that the latices in which morpholine is used to adjust the pH are more freeze-thaw stable than the other latices. These results are quite surprising since morpholine is one of the weakest bases used. Also, the latex iminated with ⅓ the molar amount of imine and in which the pH is adjusted with morpholine is substantially more stable than all the other latices.

TABLE I.—FREEZE-THAW STABILITY OF BASE-TREATED IMINATED LATICES

| Example 1 Latex A | Imination Ratio Imine/COOH | Base Used | Final pH | No. of Freeze-Thaw Cycles Passed |
|---|---|---|---|---|
| 2-EHA/MMA/MAA, 53/44/3 | 1:3 | Ammonium Hydroxide | 10 | 0 |
| 2-EHA/MMA/MAA, 53/44/3 | 1:3 | Diethylethanol Amine | 10 | 0 |
| 2-EHA/MMA/MAA, 53/44/3 | 1:3 | Morpholine | 10 | >5 |
| 2-EHA/MMA/MAA, 53/44/3 | 1:3 | Triethylene Diamine | 10 | 0 |
| 2-EHA/MMA/MAA, 53/44/3 | 2:3 | Ammonium Hydroxide | 10 | 0 |
| 2-EHA/MMA/MAA, 53/44/3 | 2:3 | Diethylethanol Amine | 10 | 0 |
| 2-EHA/MMA/MAA, 53/44/3 | 2:3 | Morpholine | 10 | 2 |
| 2-EHA/MMA/MAA, 53/44/3 | 2:3 | Triethylene Diamine | 10 | 0 |
| 2-EHA/MMA/MAA, 53/44/3 | 3:3 | Ammonium Hydroxide | 10 | 0 |
| 2-EHA/MMA/MAA, 53/44/3 | 3:3 | Diethylethanol Amine | 10 | 0 |
| 2-EHA/MMA/MAA, 53/44/3 | 3:3 | Morpholine | 10 | 1 |
| 2-EHA/MMA/MAA, 53/44/3 | 3:3 | Triethylene Diamine | 10 | 0 |

*Example 2*

| | Parts by weight |
|---|---|
| Portion 1: | |
|   Deionized water | 184.5 |
|   Nonionic surfactant (nonylphenoxy (ethyleneoxy) ethanol) | 91.0 |
| Portion 2: | |
|   Leionized water | 1818.6 |
|   Anionic surfactant (sodium lauryl sulfate) | 7.9 |
| Portion 3: | |
|   Ethyl acrylate | 1254.4 |
|   Methyl methacrylate | 518.1 |
|   Methacrylic acid | 46.5 |
| Portion 4: | |
|   Deionized water | 32.4 |
|   Sodium metabisulfite | 2.6 |
| Portion 5: | |
|   Deionized water | 20.4 |
|   Ammonium persulfate | 3.1 |
| Portion 6: | |
|   Deionized water | 14.5 |
|   Ammonium persulfate | 0.8 |
| Portion 7: | |
|   Deionized water | 27.7 |
|   Ammonium persulfate | 0.8 |
| Portion 8: | |
|   Deionized water | 24.5 |
|   35% Aqueous solution of hydrogen peroxide | 7.0 |
| Portion 9: Propylenimine | 10.2 |
| Total | 4065.0 |

Each portion is premixed before it is added. Portions 1, 2, 4, 5 and 10% of Portion 3 are charged into a conventional polymerization vessel equipped with stirrer, thermometer, condenser and means to introduce nitrogen and reagents. The following polymerization reaction is carried out under nitrogen. The contents of the polymerization vessel are heated to about 78° to 80° C. with constant stirring. The remainder of Portion 3 is added gradually and simultaneously with Portions 6, 7 and 8 over a period of 162 minutes. Portion 6 is added after ½ of Portion 3 is added. Portion 7 is added when about 90% of Portion 3 is added. The remainder of Portion 3 is added and then Portion 8 is added. Portion 9 is added slowly with constant agitation while maintaining the temperature for an additional 30 minutes. The latex is cooled to 25° C. and the pH is adjusted to about 10 with morpholine. Latex B has a polymer solids content of 47% and is a 69/28.5/2.5 interpolymer of ethyl acrylate:methyl methacrylate:methacrylic acid and has a molecular weight of over a million. Analysis of the polymer acid content shows that about ¼ of the pendant acid groups are esterified.

Latex B is subjected to the freeze-thaw stability test of Example 1 and passed five freeze-thaw cycles without showing any significant increase in viscosity or polymer coagulation.

*Example 3*

Latices A and B are formulated into paints by adding pigment and various modifiers in the form of a premixed dispersion prepared according to Formula 1.

FORMULA 1.—PIGMENT DISPERSION

| | Parts by weight |
|---|---|
| Portion 1: | |
|   Talc pigment, extender | 234.9 |
|   Methyl cellulose, "Methocel" HG | 5.3 |
| Portion 2: | |
|   Water | 253.5 |
| Portion 3: | |
|   Anti-foam agent, "Nopco" 1497V | 5.3 |
|   Potassium tripolyphosphate | 3.0 |
|   Ammonium hydroxide (28% aqueous solution) | 4.1 |
|   Bodying agent, "Acrysol" A–3 | 9.0 |
|   Phenyl mercury oleate (10% solution in mineral spirits) | 57.9 |
|   Ethylene glycol | 28.5 |
| Portion 4: | |
|   Titanium dioxide pigment Anatase | 108.4 |
|   Titanium dioxide pigment Rutile | 484.8 |
| Portion 5: | |
|   Water | 39.7 |
|   Ethylene glycol | 17.7 |
| Portion 6: | |
|   Nonionic surfactant, 50% aqueous solution Triton X–100 (octyl phenyl polyglycol ether) | 1.1 |
|   Water | 35.4 |
| Portion 7: | |
|   Mica | 195.2 |
|   Ammonium hydroxide (20% aqueous solution) | 4.1 |
|   Anti-foam agent, "Nopco" 1497V | 3.0 |
| Total | 1490.9 |

In Formula 1, "Methocel" HG has a viscosity of 3000 to 5000 centipoises at 20° C., measured on a 2% aqueous solution. "Nopco" 1497V is understood to be composed of 60% anionic sulfated saturated fatty acid, 8% free fatty acid, and 32% inert matter. "Acrysol" A–3 is a 25% aqueous solution of low molecular weight water-soluble polyacrylic acid.

The 7 portions of Formula 1 are introduced into a mixing tank in the order shown and uniformly blended and dispersed in accordance with conventional procedure for making pigment dispersions for use in latex paints.

Latex Paints A and B are prepared by uniformly blending the following components:

LATEX PAINT A

| | Parts by weight |
|---|---|
| Formula 1 pigment dispersion | 149.09 |
| Latex A (iminated 2-EHA/MMA/MAA) | 142.10 |
| Ethylene glycol | 1.48 |
| Morpholine | 1.97 |
| Water | 5.50 |
| Total | 300.14 |

The resulting paint has a pigment volume concentration of 31%, a pH of about 9.7, a density of about 11.6 pounds per gallon and viscosity of about 75–82 Krebs units.

LATEX PAINT B

| | Parts by weight |
|---|---|
| Formula 1 pigment dispersion | 252.6 |
| Latex B | 268.0 |
| Morpholine | 3.5 |
| Total | 524.1 |

The resulting paint has a pigment volume concentration of about 30%, a pH of about 9.5, a density of about 11.3 pounds per gallon and a viscosity of about 78 to 83 Krebs units.

About 1 pint of each of the above paints is subjected to a freeze-thaw cycle of 16 hours at −18° C. and 16 hours at about 25 to 26° C. After each cycle, the latices are examined for polymer coagulation. After five freeze-thaw cycles, no polymer coagulation or grit deposits of polymer were formed in any of the paints nor did a significant change in viscosity occur.

To determine if the morpholine used to stabilize the latices A and B has an adverse effect on the paint, one coat of each of the above paints A and B is applied using an ordinary paint brush to the exterior walls of a house. Both of the Latex Paints have excellent application properties and air dry under ordinary atmospheric conditions. Each paint coating is examined at frequent intervals over a period of several months and each paint is found to have excellent resistance to cracking and blistering and in general good retention of appearance.

Example 4

The following carboxylic polymer Latex C is prepared using constituents and a polymer procedure similar to Example 1 with the exception that the following monomeric components are used: butyl acrylate/methyl methacrylate/methacrylic acid in a ratio of 58/39/3.

Carboxylic Polymer Latex C has a polymer solids content of about 41% and has a molecular weight over a million. The latex is divided into two equal portions which are iminated respectively with 2/3 and 3/3 of the molar amount of propylenimine required to esterify all the pendant carboxyl groups of the polymer by following the imination procedure of Example 1.

The latex portion iminated with 3/3 of the molar amount of propylenimine necessary to esterify the pendant carboxyl groups is divided into six equal portions and each portion is adjusted to a pH 10, respectively, with ammonium hydroxide, sodium hydroxide, tetramethyl ammonium hydroxide, morpholine, diethylethanol amine, and triethylamine.

The latex portion iminated with 2/3 of the molar amount of propylenimine necessary to esterify all the pendant carboxyl groups is divided into three equal portions and each portion is adjusted to pH 10, respectively, with ammonium hydroxide, diethylethanol amine, and morpholine.

Each of the above latices in which the pH is tested for freeze-thaw stability by the procedure of Example 1. The results of this test are shown in Table II and indicate that the latices in which the pH is adjusted with morpholine are substantially more freeze-thaw stable than the latices in which conventional bases and amines are used to adjust the pH.

TABLE II.—FREEZE-THAW STABILITY OF BASE-TREATED IMEINATD LATICES

| Example 4 Latex C | Imination Ratio Imine/COOH | Base Used | Final pH | No. of Freeze-Thaw Cycles Passed |
|---|---|---|---|---|
| BA/MMA/MAA, 58/39/3 | 3:3 | Ammonium Hydroxide | 10 | 0 |
| BA/MMA/MAA, 58/39/3 | 3:3 | NaOH | 10 | 0 |
| BA/MMA/MAA, 58/39/3 | 3:3 | Tetramethyl ammonium hydroxide | 10 | 0 |
| BA/MMA/MAA, 58/39/3 | 3:3 | Morpholine | 10 | >5 |
| BA/MMA/MAA, 58/39/3 | 3:3 | Diethylethanol amine | 10 | 0 |
| BA/MMA/MAA, 58/39/3 | 3:3 | Triethylamine | 10 | 0 |
| BA/MMA/MAA, 58/39/3 | 3:2 | Ammonium Hydroxide | 10 | 0 |
| BA/MMA/MAA, 58/39/3 | 3:2 | Diethylethanol amine | 10 | 1 |
| BA/MMA/MAA, 58/39/3 | 3:2 | Morpholine | 10 | >5 |

Example 5

The following carboxylic polymer latices are prepared using constituents and a polymerization procedure similar to that used in Example 1 with the exception of the monomeric components:

| | Polymeric Component | Ratio |
|---|---|---|
| Latex D | Styrene:butyl acrylate:methacrylic acid | 56:40:4 |
| Latex E | Vinyl acetate:dibutyl maleate:methacrylic acid | 73:24:3 |
| Latex F | Vinyl acetate:2-ethylhexyl acrylate:crotonic acid | 72:24:4 |

Latices D, E and F are each iminated with 1/3 of the molar amount of propylenimine necessary to esterify all the pendant carboxyl groups of the polymer by the procedure of Example 1. The pH of the latices is adjusted to about 10 with morpholine. The iminated polymers have a molecular weight over a million and the latices have a polymer solids content of about 48%.

The iminated Latices D, E and F are each subjected to the freeze-thaw stability test of Example 1 and passed five freeze-thaw cycles without show of any polymer coagulation or significant increase in viscosity.

Example 6

The following carboxylic polymer latices are prepared using constituents and a polymerization procedure similar to that used in Example 1 with the exception of the polymeric components and the polymerization equipment which is adapted in such a manner so that gaseous butadiene monomer component can be copolymerized:

| | Polymeric Component | Ratio |
|---|---|---|
| Latex G | Methyl methacrylate:butadiene:methacrylic acid. | 55:40:5 |
| Latex H | Styrene:butadiene:methacrylic acid | 56:40:4 |

Latices G and H are each iminated with ⅓ the molar amount of propylenimine necessary to esterify all the pendant carboxyl groups of the polymer by the procedure of Example 1. The pH of the latices is adjusted to about 10 with morpholine. The resulting iminated polymers have a molecular weight over a million and the latices have a polymer solids content of about 42%.

The iminated Latices G and H are each subjected to the freeze-thaw stability test of Example 1 and passed five freeze-thaw cycles without show of any polymer coagulation or significant increase in viscosity.

*Example 7*

An aminoester polymer latex is prepared by first forming a latex of a carboxylic polymer by generally following the polymerization procedure of Example 1. The resulting carboxylic polymer latex, which has the composition of 97:3, butylmethacrylate:methacrylic acid, is then iminated with ⅓ of the molar amount of propylenimine necessary to esterify all the pendant carboxyl groups of the polymer according to the procedure of Example 1 to form Latex I.

An exterior clear paint is prepared by uniforming blending the following components:

| | Parts by weight |
|---|---|
| Latex I | 100 |
| Carbitol | 5 |
| Nonionic surfactant 50% aqueous solution of Triton X–100 (octyl phenyl polyglycol ether) | 3 |
| Xylene | 10 |
| Water | 25 |
| 2,4-dihydroxybenzophenone | 3.7 |
| Methyl cellulose, "Methocel HG" (identified in Example 1) | 0.3 |
| Morpholine | 0.5 |
| Total | 147.5 |

The exterior clear paint has excellent package stability and is resistant to freezing and thawing. When the paint is applied as a coating to a wood substrate exposed outdoors, the coating has good durability to weathering and excellent gloss retention.

*Example 8*

A latex is prepared by first forming a latex of a carboxylic acid polymer by following the polymerization procedure of Example 1 of U.S. Patent 3,069,375. The resulting carboxylic polymer latex, which has the composition of 63:32:5, acrylonitrile:butyl acrylate:methacrylic acid and a solids content of 32%, is then iminated with ⅓ of the molar amount of propylenimine necessary to esterify all of the pendant carboxyl groups of the polymer according to the procedure of Example 1 to form Latex J.

Latex Paint J is formulated by uniformly blending the following:

| | Parts by weight |
|---|---|
| Latex J | 650 |
| Nonionic surfactant, 50% aqueous solution of Triton X–100 (octyl phenyl polyglycol ether) | 20 |
| Methyl cellulose solution (16% solids in ethylene glycol) | 21 |
| Formula 1—Pigment Dispersion (see Example 1) | 547 |
| Benzyl butyl phthalate | 50 |
| Diacetone alcohol | 50 |
| Morpholine | 10 |
| Total | 1348 |

The resulting paint has a pigment volume concentration of about 30%, and a density of about 11 pounds per gallon. The paint has excellent freeze-thaw stability and forms a continuous protective coating when applied to metal substrates and dried at elevated temperatures.

*Example 9*

A latex is prepared by first forming a carboxylic polymer of 84.8:13.5:1.7, ethylene:ethyl acrylate:methacrylic acid which is emulsified into a latex, and then the carboxylic polymer is iminated with an alkylene imine.

The above polymer is formed by using a high pressure polymerization vessel which can be heated to an elevated temperature. The polymer is formed at 1430 atmospheric pressure and at 190° C. The reactants are continuously fed into the polymerization vessel at the following rates:

| | |
|---|---|
| Ethylene | lbs./hr 5.37 |
| Ethyl acrylate | lbs./hr 0.174 |
| Methacrylic acid | lbs./hr 0.015 |
| Benzene (used as a diluent for the monomer and the catalyst) | lbs./hr 2.87 |
| Catalyst-(t-butylpersulfate) | lbs./1000 lbs. polymer 0.116 |

A solvent monomer ratio of 0.516 is maintained throughout the reaction. Percent conversion is about 13%.

The polymer is then emulsified into a carboxylic polymer latex by a procedure well known in the art. The latex has a polymer solids content of about 40% and is adjusted to a pH of 7 with morpholine.

The carboxylic polymer latex is iminated with ⅓ of the molar amount of propylenimine necessary to esterify all the pendant carboxyl groups of the polymer according to the procedure of Example 1.

The latex paint is formulated from the above iminated polymer latex by using the pigment dispersion of Formula 1 and by generally following the formulation used in forming Latex Paint A of Example 3.

The resulting paint has a pigment volume concentration of about 30%, and a density of about 11.6 pounds per gallon.

The paint has excellent freeze-thaw stability and adheres well to a variety of substrates.

I claim:

1. A freeze-thaw stable aqueous film forming composition consisting essentially of a dispersion of a water-insoluble negatively charged carboxylic vinyl addition polymer and a compound of the Formula A:

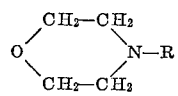

wherein R is from the group of hydrogen and $C_1$ to $C_4$ alkyl radical; said vinyl addition polymer consisting essentially of $C_2$ to $C_{20}$ monomeric units and containing about 0.3 to 5% by weight of ethylenically unsaturated carboxylic acid units and having attached to the carbon atoms in the polymer backbone about 0.03% to 3% by weight of said vinyl addition polymer, monovalent amino-ester radicals of the formula:

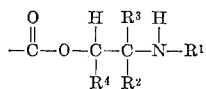

wherein $R^1$ is selected from the group consisting of hydrogen, benzyl and $C_1$ to $C_5$ alkyl radicals, $R^2$ and $R^3$ are selected individually from the group consisting of hydrogen, benzyl, aryl and $C_1$ to $C_5$ alkyl radicals, and $R^4$ is selected from the group consisting of hydrogen and $C_1$ to $C_5$ alkyl radicals; said composition containing an amount of the compound of Formula A sufficient to provide a pH of about 7 to 10 and containing 0.3 to 10% by weight based on the weight of said vinyl addition polymer of a surfactant of the group of anionic surfactants, nonionic surfactants and a mixture of nonionic and anionic surfactants.

2. The aqueous film forming composition of claim 1 in which the said compound is morpholine.

3. The aqueous film forming composition of claim 2 in which pigment is dispersed therein in a pigment volume concentration of about 10 to 50%.

4. The aqueous film forming composition of claim 2 in which the vinyl addition polymer has an aminoester content of about 0.1 to 1% by weight and contains about 1.5 to 3% by weight of alpha,beta-unsaturated monovinylidene carboxylic acid units.

5. The aqueous film forming composition of claim 2 in which $R^1$, $R^2$, $R^3$ and $R^4$ are hydrogen.

6. The aqueous film forming composition of claim 2 in which $R^1$, $R^3$, $R^4$ are hydrogen and $R^2$ is methyl.

7. The aqueous film forming composition of claim 2 in which the vinyl addition polymer consists essentially of units of an alpha,beta-unsaturated monovinylidene carboxylic acid and units of at least one methacrylic ester of $C_1$ to $C_4$ saturated aliphatic monohydric alcohol.

8. The aqueous film forming composition of claim 2 which the vinyl addition polymer consists essentially of units of an alpha,beta-unsaturated monovinylidene carboxylic acid, units of acrylonitrile and units of at least an acrylic acid ester of a $C_1$ to $C_8$ saturated monohydric alcohol.

9. The aqueous film forming composition of claim 2 in which the vinyl addition polymer consists essentially of units of an alpha,beta-unsaturated monovinylidene carboxylic acid, units of styrene and at least one acrylic acid ester of $C_1$ to $C_8$ saturated monohydric primary alcohol.

10. The aqueous film forming composition of claim 2 in which the vinyl addition polymer consists essentially of units of an alpha,beta-unsaturated monovinylidene carboxylic acid, units of styrene and units of butadiene.

11. The aqueous film forming composition of claim 2 in which the vinyl addition polymer consists essentially of units of an alpha,beta-unsaturated monovinylidene carboxylic acid and units of ethylene.

12. The aqueous film forming composition of claim 2 in which the vinyl addition polymer consists essentially of units of methacrylic acid and units of a mixture of ethyl acrylate and ethylene.

13. The aqueous film forming composition of claim 2 in which the vinyl addition polymer consists essentially of units of an alpha,beta-unsaturated monovinylidene carboxylic acid and units of a mixture of esters of vinyl acetate and at least one acrylic acid ester of a $C_1$ to $C_8$ saturated aliphatic monohydric primary alcohol.

14. The aqueous film forming composition of claim 2 in which the vinyl addition polymer consists essentially of units of an alpha,beta-unsaturated monovinylidene carboxylic acid and units of a mixture of methyl methacrylate and butadiene.

15. The aqueous film forming composition of claim 2 in which the vinyl addition polymer consists essentially of units of methacrylic acid and units of a mixture of vinyl acetate and dibutyl maleate.

16. The aqueous film forming composition of claim 2 in which the vinyl addition polymer is at least ternary in composition consisting essentially of 0.3 to 5% by weight of units of (A) an ethylenically unsaturated carboxylic acid and the remainder of said vinyl addition polymer consisting essentially of units of a mixture of esters of (B) methacrylic acid and (C) acrylic acid, said esters being of a $C_1$ to $C_8$ saturated aliphatic monohydric primary alcohol.

17. The aqueous film forming composition of claim 16 in which the units of a mixture of esters of said vinyl addition polymer consists essentially of methyl methacrylate and ethyl acrylate.

18. The aqueous film forming composition of claim 16 in which the units of a mixture of esters of said polymer consists essentially of methyl methacrylate and 2-ethylhexyl acrylate.

19. A freeze-thaw stable paint consisting essentially of pigment in a pigment volume concentration of about 10–50% and dispersion of a water-insoluble negatively charged carboxylic vinyl addition polymer and morpholine; said vinyl addition polymer consisting essentially of 1.5 to 3% by weight of (A) units of an alpha,beta-unsaturated monovinylidene carboxylic acid selected from the group of acrylic acid, methacrylic acid, crotonic acid, and itaconic acid and units of a mixture of (B) methyl methacrylate and (C) at least one acrylic acid ester of a $C_2$–$C_8$ saturated aliphatic monohydric primary alcohol and having attached to the carbon atoms in the polymer backbone about 0.1 to 1% by weight of said vinyl addition polymer aminoester radicals of the formula:

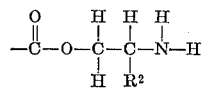

wherein $R^2$ is selected from the group consisting of hydrogen and methyl; said paint containing at least 0.6% by weight morpholine and up to an amount sufficient to provide a pH between 8 and 10 and containing 1 to 6% by weight based on the weight of said vinyl addition polymer of at least one water-soluble nonionic surfactant.

References Cited by the Examiner
UNITED STATES PATENTS

| | | | |
|---|---|---|---|
| 2,915,480 | 12/1959 | Reeves et al. | 260—79 |
| 3,113,038 | 12/1963 | Lattarulo et al. | 117—140 |
| 3,156,687 | 11/1964 | Andersen et al. | 252—180 |

MURRAY TILLMAN, *Primary Examiner.*

W. J. BRIGGS, Sr., *Assistant Examiner.*